United States Patent [19]

Golob et al.

[11] 4,212,537
[45] Jul. 15, 1980

[54] SYSTEM FOR TESTING OPTICAL FIBERS

[75] Inventors: John E. Golob, Olathe, Kans.; Larry D. Looney; Peter B. Lyons, both of Los Alamos, N. Mex.; Melvin A. Nelson; Terence J. Davies, both of Santa Barbara, Calif.

[73] Assignee: The United States of America as represented by the Unied States Department of Energy, Washington, D.C.

[21] Appl. No.: 954,381

[22] Filed: Oct. 24, 1978

[51] Int. Cl.² ............................................. G01N 21/16
[52] U.S. Cl. ................................................... 356/73.1
[58] Field of Search ......................................... 356/73.1

[56] References Cited
U.S. PATENT DOCUMENTS 4,012,149  3/1977  Bouillie et al. ...................... 356/73.1

*Primary Examiner*—Vincent P. McGraw
*Attorney, Agent, or Firm*—R. V. Lupo; John A. Koch

[57] ABSTRACT

A system for measuring a combination of optical transmission properties of fiber optic waveguides. A polarized light pulse probe is injected into one end of the optical fiber. Reflections from discontinuities within the fiber are unpolarized whereas reflections of the probe pulse incident to its injection remain polarized. The polarized reflections are prevented from reaching a light detector whereas reflections from the discontinuities reaches the detector.

16 Claims, 2 Drawing Figures

SYSTEM FOR TESTING OPTICAL FIBERS

BACKGROUND OF THE INVENTION

The invention described herein was made in the course of Contracts EY-76-C-08-1183 and W-7405-ENG-36 with the U.S. Department of Energy.

This invention relates to fiber optic waveguides and more particularly to a system for measuring a combination of important optical transmission properties of fiber optic lightguides using a single apparatus.

Convenient nondestructive techniques for rapidly evaluating the optical transmission properties of optical fibers are essential to the application of such fibers in the transmission of intelligence via light through these fibers. Techniques for measuring the length of optical fibers and detecting fiber discontinuities by the pulse reflection method where only one end is accessible have been reported by Y. Ueno and M. Skimizu, "Optical Fiber Fault Location Method," *Applied Optics*, V. 15, No. 6, June 1976, pp. 1385-1388, and S. D. Personick, "Photon Probe—An Optical Fiber Time Domain Reflectometer," *Bell System Technical Journal*, V. 56, No. 3, March 1977, pp. 355-366. Measuring attenuation by analysis of backscattering light has been described by M. K. Barnoski and S. M. Jensen, "Fiber Waveguides: A Novel Technique for Investigating Attenuation Characteristics," *Applied Optics*, V. 15, No. 9, September 1976, pp. 2112-2115. Another description of the Barnoski et al. work is reported in *Applied Optics*, V. 16, No. 9, September 1977, pp. 2375-2379.

Typically, in these prior art systems, lasers are used to launch short optical probe pulses into the fiber. Sensitive receivers detect pulse reflections from discontinuities such as cracks, small fractures, connectors, or splices along the fiber length as well as from the other end. The distance to the discontinuity can be determined from the elapsed time between the launching of the probe pulse and the return of the reflection through the relationship $$L = (c/n) \cdot (t/2)$$

where c is the velocity of light and n is the index of refraction for the particular fiber.

The probe and discontinuity reflected pulses are detected by a photodetector such as a photomultiplier and are usually displayed on a conventional oscilloscope from which the two-way transit time can be determined. Obtaining high sensitivities to reflections and backscatter in relatively long fibers, i.e., over about 1 km, has been achieved by driving the laser pulse source to a high peak power output. The reflections of the high-power probe pulse incident to its injection into the input end of the fiber present a serious problem, however, in that the photodetector becomes saturated by those end reflections. These reflections are from the sampling optics, the fiber holder, and the Fresnel reflection at the fiber input. The combined intensity of these reflections can be many times greater than the intensity of a reflection from a fiber discontinuity. When hard saturation of the photodetector occurs, the detector can "hang up," i.e., produce an output signal of much longer duration than the detected pulse. Output signals of microseconds duration in response to optical input pulses of a few nanoseconds are typical. Accordingly, when the detector is "hung up", it is insensitive to low-level reflections from fiber discontinuities.

Several prior art techniques have been employed to overcome this problem, as the above-cited references indicate. One is the use of a special gated photomultiplier which can be gated to shut off or to reduce the gain of the photomultiplier for the duration of the initial probe pulse. This requires a special tube with gating capability in addition to gating electronics. Also, system sensitivity is zero while the tube is gated off, during which time it is not possible to detect reflections from discontinuities.

Another technique is the use of a y fiber optical directional coupler wherein the probe pulse is coupled to the test fiber through a fiber pigtail. The reflected pulses are coupled back into the pigtail and to a second fiber which terminates at the photodetector and is welded to the pigtail. Using this technique the detector collects only that portion of probe pulse which is reflected from the test fiber input face.

In the face of the foregoing state of the art, we have devised a system for injecting the optical probe pulse into the fiber which provides a great improvement over previously known systems. With the use of our invention, only a small portion of the probe pulse reaches the photodetector via reflections from the input end of the fiber. This small portion is sufficient to trigger the sweep of and be displayed on an oscilloscope and/or may be used to trigger a time interval meter or similar interval measuring means but is not great enough to effect hard saturation of the photodetector or mask reflections from discontinuities near the input end of the fiber.

SUMMARY OF INVENTION

Accordingly, it is an object of the invention to provide a system for measuring optical transmission characteristics of fiber optic waveguides which overcomes difficulties of previously used systems. It is a further object of the invention to provide a system for detecting the location of discontinuities along the length of an optical fiber which may occur close to the end of the fiber into which an optical probe pulse is injected.

Briefly summarized, the above and additional objects are accomplished by utilizing an optical probe pulse that is split into polarized portions, or polarization fractions, with one of the polarized portions being injected into the fiber. Since most of the reflections from the input end of the fiber will retain their direction of polarization, they can be prevented from reaching the photodetector or phototube by suitable means positioned in the path between the fiber and the detector. A relatively small portion of that reflected light which is scattered sufficiently to lose its polarization reaches the phototube, thereby becoming the "start" pulse which triggers the timing sequence. Since the probe pulse injected into the fiber rapidly loses its polarization due to multiple radial reflections within the fiber, the discontinuity reflections coming out of the fiber are principally unpolarized and, therefore, reach the phototube. Further reductions in the receipt of undesired light at the photodetector can be accomplished by the appropriate placement of an additional polarizer or absorber and restricting the viewing angle of the photodetector.

Accordingly, the system in accordance with the invention greatly reduces the proportion of the reflections of the probe pulse from the input end of the fiber which actually reaches the photodetector. Consequently, the ratio of the intensity of the end reflections to reflections from discontinuities in the fiber is greatly reduced. The reduction makes it possible to employ large electrical amplification of the photodetector output signals, thereby increasing the sensitivity of discontinuity detection and avoiding saturation effects from input end reflections.

The above-mentioned and additional objects, advantages, and applications of the invention and a further understanding of the invention will be apparent after consideration of the following detailed description in conjunction with the accompanying drawing.

DETAILED DESCRIPTION

Figure 1:
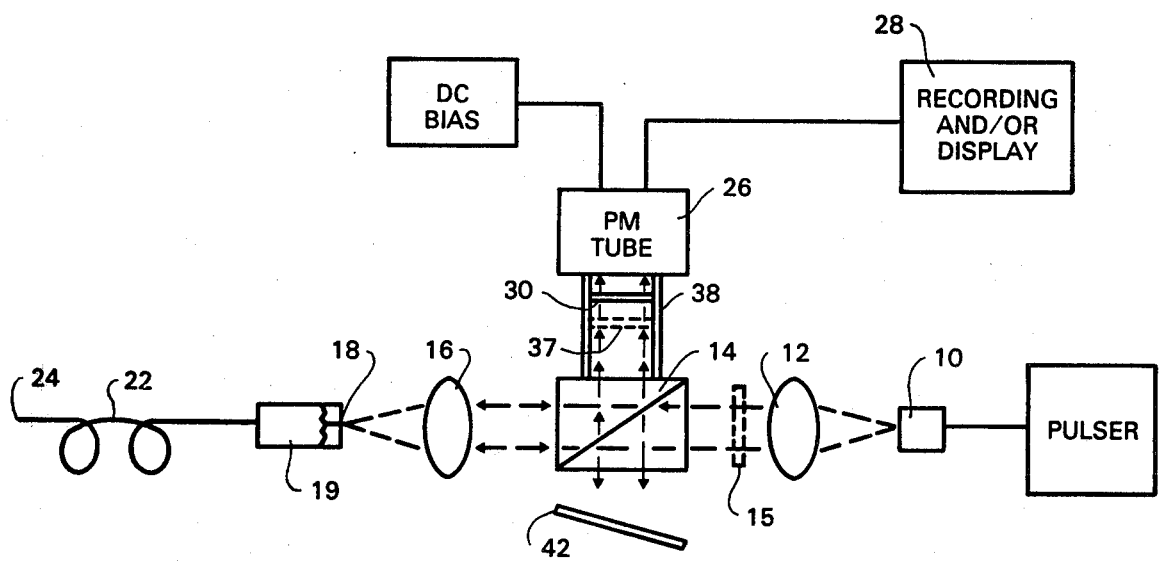
FIG. 1 is a schematic representation of a system in accordance with the invention.

Referring now to FIG. 1, a pulse of light generated by laser 10 is collected by lens 12 and directed into beam-splitter 14. The light pulse is divided into two orthogonally polarized components either by using a polarizing beamsplitter at 14 or by use of a polarizer 15 in conjunction with a nonpolarizing beamsplitter at 14. One of the polarization components of the pulse is focused by lens 16 and injected into one end 18 of the optical fiber 22 to be evaluated. Positioner 19, shown with its one end broken away to show end 18, positions end 18 for receipt of the probe pulse from lens 16.

The light probe injected into the fiber rapidly loses its polarization due to multiple internal reflections within the fiber. The probe pulse travels down the fiber and is partially reflected by discontinuities such as cracks, small fractures, connectors, or splices and from extreme end 24. These unpolarized discontinuity reflections are transmitted back to input end 18, collimated by lens 16, and divided by beamsplitter 14 into two components. One of those two components is directed by beamsplitter 14 to impinge upon a photodetector 26, such as a photomultiplier tube (PMT), while the other is passed through the beamsplitter to the area of laser 10 and is absorbed or scattered and lost. The PMT output is recorded, displayed, and/or otherwise processed at 28. A narrow band filter 30, transmitting light at the laser wavelengths, may be provided if desired to suppress ambient background light.

Figure 2:
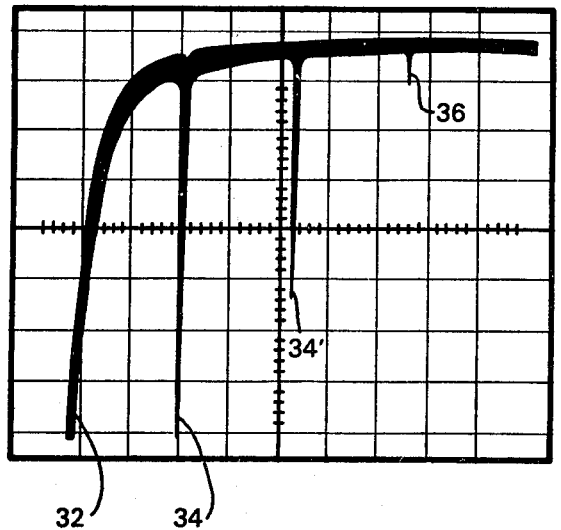
FIG. 2 is representative of a typical oscillogram showing reflections from the start pulse, a fiber discontinuity, and the end of the fiber.

A typical display, such as would be obtained by an oscilloscope at 28, is shown in FIG. 2 wherein pulse 32 represents the probe pulse, 34 and 34' represent reflections from discontinuities in the fiber, and 36 the reflection from extreme end 24. The elapsed time represented by the distance between probe pulse 32 and discontinuity pulses 34, for instance, is the two-way transit time to the discontinuity. The actual distance of the discontinuity from end 18 can, therefore, be readily determined from use of the formula given above.

With prior art systems which do not inject a polarized probe pulse into end 18 of the fiber, the start pulse for recording components 28 would consist of reflections of the probe pulse from such things as the sampling optics, the fiber positioner 19, fiber end 18, etc., which would be directed to photodetector 26. The combined intensity of these reflections can be many times greater than the intensity of a reflection to be measured from a fiber discontinuity. The magnitude of the problem can be appreciated when it is considered that the maximum intensity of a reflection from any discontinuity within the fiber cannot exceed 4% (Fresnel reflection) of the injected probe pulse, whereas reflections from the sources just identified are much greater. The net result is that the ratio of the amplitude of the start pulse to discontinuity pulses can easily exceed 25 to 1 with those prior art systems. This compares with a typical ratio lower than 4 to 1 using the system according to the invention.

Absent a gating arrangement which would shut off or reduce the gain of PMT 6 for the duration of the initial probe pulse, the PMT would go into hard saturation and be insensitive to low-level reflections from fiber discontinuities. Since the recovery time of a photodetector is generally relatively long, reflections from discontinuities occurring close to input end 18 would not be detected.

With the use of a polarized probe pulse, however, the reflections of the initial probe pulse, which, for the most part, would retain the direction of polarization, are prevented from reaching PMT 26. With the use of a polarizing beamsplitter at 14, the polarized reflections are passed through the beamsplitter toward the area of the laser where they are scattered and lost. With the use of a nonpolarizing beamsplitter at 14 (together with a polarizer 15), the portion of the polarized reflections directed toward PMT 26 by the beamsplitter is prevented from reaching the PMT by an analyzer 37 positioned in opaque-walled baffle 38. Coupling the phototube to the beamsplitter by baffle 38 restricts the viewing angle of the PMT and essentially prevents reflected light other than that from beamsplitter 14 from reaching PMT 26.

However, a very small part of the total light reflected from end 18, positioner 19, etc., toward beamsplitter 14 is scattered sufficiently to lose its original polarization. Being unpolarized, at least a portion of it will reach PMT 26 whether a polarizing beamsplitter 14 or an analyzer 37 is utilized. It is this relatively small portion of the end reflections of the probe pulse that is used to trigger the time interval recording means such as by triggering the sweep of an oscilloscope. As previously indicated, the ratio of the amplitude of the start pulse to a discontinuity reflection pulse when a polarized probe pulse is utilized is typically lower than 4 to 1 as opposed to much larger ratios utilizing prior art systems.

As indicated above, the probe pulse entering end 18 of the fiber rapidly loses its polarization due to multiple internal reflections. Therefore, the discontinuity reflections coming out of the fiber are unpolarized. Accordingly, regardless of whether beamsplitter 14 is polarizing or nonpolarizing, as these discontinuity reflections are emitted into beamsplitter 14, they are separated into two components, one being reflected into PMT 26 and recorded, and the other passing through the beamsplitter to the laser source area where it is scattered and lost.

It is very desirable that an optical element 42 be positioned at the beamsplitter surface opposite the photodetector to minimize undesired emissions or reflections from reaching the photodetector. Element 42 may be an analyzer, an optical absorber, or other element that effectively immobilizes light directed by the beamsplitter toward that opposite surface. Best results are obtained by positioning element 42 at an angle to that surface in order that reflections from the surface of element 42 not be directed toward PMT 26.

We have also found that the use of the system in accordance with the invention does not necessarily entail the rejection of 50% of the probe pulse initiated by laser 10 as would normally result from use of a beamsplitter at 14. Some semiconductor lasers produce light that is more polarized in one direction than the other. The degree of this polarization, from laser to laser, can range from 2:1 to 7:1. Accordingly, with this laser property and the use of a polarizing beamsplitter at 14, significantly more than 50% of the laser output may be passed through the beamsplitter to fiber input end 18 by appropriately orienting the components. A conventional, i.e., nonpolarizing, beamsplitter, on the other hand, will have a maximum efficiency at a 50%–50% splitting ratio with either polarized or unpolarized light.

A particular laser which has been found to be quite satisfactory in this respect is the gallium aluminum arsenide (GaAlAs) laser which is sold by RCA Corporation of New York, New York, under RCA part number C30099. The degree of polarization of particular lasers under that part number has been found to range from 2:1 to 7:1. Other laser types have shown a similar property with respect to predominant polarization. With the GaAlAs laser, a peak power of several watts is easily available. It is capable of providing a pulse having a fast rise time and short duration, when driven by a suitable electrical pulse source, thereby permitting a relatively high optical sensitivity and high resolution. For example, a pulse having less than one nanosecond rise time has been injected into an 800 m long graded-index fiber having a 65 $\mu$m diameter core, to which 18 m of another fiber was spliced. The rise time of the return pulses reflected from the splice and fiber end were sufficiently fast rising to resolve the location and length of spliced-on fiber to less than one meter.

While the fundamental novel features of the invention have been shown and described and pointed out as applied to particular embodiments by way of example, it will be appreciated by those skilled in the art that various omissions, substitutions, and changes may be made within the principle and scope of the invention as expressed in the appended claims.

What we claim is:

1. In a system for locating discontinuities within an optical fiber which includes means for generating a light probe pulse and for injecting said light probe pulse into one end of the fiber, and means for detecting reflections of said pulse incident to said injection to initiate a timing sequence and reflections caused by discontinuities along the length of said fiber, the improvement comprising:
    a. means for polarizing said light probe pulse and for injecting only one of the resulting polarized portions into said one end of said fiber, and
    b. means for preventing a majority of the reflections of said one polarized portion incident to said injection from reaching said detecting apparatus and for permitting half of the light which exits from the injection end of the fiber to reach said detecting apparatus, this light having been reflected from fiber discontinuities.

2. The improvement of claim 1 wherein said means for polarizing and said means for preventing comprise a polarizing beam splitter.

3. The improvement of claim 1, including a beamsplitter positioned between said means for generating light and said fiber end and said means for detecting and wherein said means for polarizing is a polarizer element positioned between said apparatus for generating light and said beamsplitter and said means for preventing, comprise an analyzer positioned between said beamsplitter and said means for detecting reflections.

4. The improvement of claim 2 wherein said means for generating a light pulse is a laser.

5. The improvement of claim 4 wherein said laser produces light more polarized in one direction than the other.

6. The improvement of claim 5 wherein said laser is of the gallium aluminum arsenide type.

7. The improvement of claim 1 including means for restricting the viewing angle of said means for detecting.

8. The improvement of claim 7 wherein said means for restricting is an opaque-walled cylindrical baffle.

9. The improvement of claim 6 including means for restricting the viewing angle of said means for detecting.

10. The improvement of claim 9 wherein said means for restricting is an opaque-walled cylindrical baffle.

11. In a system for locating discontinuities within a length of optical fiber, the method steps comprising:
    a. Injecting a pulse of polarized light into one end of said fiber,
    b. Initiating a timing sequence by the detection of unpolarized light reflected at said one end incident to said injecting step, and
    c. Detecting reflections from said discontinuities within said fiber.

12. The method of claim 11 including the step of generating said pulse of polarized light.

13. The method of claim 12 wherein said pulse of polarized light is generated by passing a pulse of light through a polarizing beamsplitter and reflections from said fiber are directed into said polarizing beamsplitter prior to detection.

14. The method of claim 12 wherein said pulse of polarized light is generated by passing a pulse of light through a polarizer and including the step of preventing polarized reflections of said polarized light from reaching the means for performing said initiating step.

15. In a system for locating discontinuities within a length of optical fiber, the steps comprising
    a. Generating a light pulse probe,
    b. Polarizing said light pulse probe,
    c. Injecting one of the polarized portions of said pulse into one end of said optical fiber,
    d. Detecting unpolarized reflections of said probe pulse from said fiber while preventing the detection of polarized reflections thereof.

16. The method of claim 15 wherein said generating step provides a light pulse more polarized in one direction than the other and the larger polarized portion is injected into said fiber.

* * * * *